US009230546B2

(12) United States Patent  
O'Sullivan et al.

(10) Patent No.: US 9,230,546 B2
(45) Date of Patent: Jan. 5, 2016

(54) VOICE CONTENT TRANSCRIPTION DURING COLLABORATION SESSIONS

(75) Inventors: Patrick Joseph O'Sullivan, Ballsbridge (IE); Edith Helen Stern, Yorktown Heights, NY (US); Barry E. Willner, Briarcliff Manor, NY (US); Hong Bing Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 13/288,594

(22) Filed: Nov. 3, 2011

(65) Prior Publication Data

US 2013/0117018 A1    May 9, 2013

(51) Int. Cl.
| | |
|---|---|
| G10L 15/00 | (2013.01) |
| G06F 17/27 | (2006.01) |
| G10L 15/26 | (2006.01) |
| G10L 17/00 | (2013.01) |
| G10L 21/00 | (2013.01) |
| G10L 25/00 | (2013.01) |
| G06Q 10/10 | (2012.01) |
| H04M 3/56 | (2006.01) |
| H04N 7/15 | (2006.01) |

(52) U.S. Cl.
CPC .............. *G10L 15/26* (2013.01); *G06Q 10/101* (2013.01); *H04M 3/567* (2013.01); *H04M 2201/40* (2013.01); *H04N 7/15* (2013.01)

(58) Field of Classification Search
USPC .............................. 704/9, 235, 246, 270, 277
See application file for complete search history.

(56) References Cited

U.S. PATENT DOCUMENTS

| | | | |
|---|---|---|---|
| 6,339,754 B1* | 1/2002 | Flanagan et al. | 704/2 |
| 6,535,848 B1* | 3/2003 | Ortega et al. | 704/235 |
| 6,559,863 B1* | 5/2003 | Megiddo | 715/753 |
| 6,775,360 B2 | 8/2004 | Davidson et al. | |

(Continued)

FOREIGN PATENT DOCUMENTS

KR    20070048903 B1    5/2007

OTHER PUBLICATIONS (http://www.ehow.com/how_2146324_buy-caption-phone.html), downloaded Nov. 3, 2011, pp. 1-4.

(Continued)

*Primary Examiner* — Olujimi Adesanya
(74) *Attorney, Agent, or Firm* — Holland & Knight LLP; Brian J. Colandreo, Esq.; Jeffrey T. Placker, Esq.

(57) ABSTRACT

A method, computer program product, and system for voice content transcription during collaboration sessions is described. A method may comprise receiving an indication to provide one or more real-time voice content-to-text content transcriptions to a first collaboration session participant. The one or more real-time voice content-to-text content transcriptions may correspond to voice content of a second collaboration session participant in one or more collaboration sessions including the first collaboration session participant and the second collaboration session participant. The method may additionally comprise defining a preference for the first collaboration session participant to receive the one or more real-time voice content-to-text content transcriptions corresponding to the voice content of the second collaboration session participant in the one or more collaboration sessions including the first collaboration session participant and the second collaboration session participant based upon, at least in part, the indication.

18 Claims, 8 Drawing Sheets

(56) References Cited

U.S. PATENT DOCUMENTS

| | | | |
|---|---|---|---|
| 6,816,468 B1* | 11/2004 | Cruickshank | 370/260 |
| 7,027,986 B2 | 4/2006 | Caldwell et al. | |
| 7,075,671 B1* | 7/2006 | Kanevsky et al. | 358/1.15 |
| 7,107,312 B2* | 9/2006 | Hackbarth et al. | 709/204 |
| 7,236,580 B1* | 6/2007 | Sarkar et al. | 379/202.01 |
| 7,346,654 B1* | 3/2008 | Weiss | 709/204 |
| 7,487,096 B1* | 2/2009 | Cox et al. | 704/277 |
| 7,617,337 B1* | 11/2009 | Beck et al. | 710/11 |
| 7,830,408 B2* | 11/2010 | Asthana et al. | 348/14.08 |
| 7,992,183 B1* | 8/2011 | Harrenstien | 725/137 |
| 8,120,638 B2* | 2/2012 | Kenoyer | 348/14.08 |
| 8,380,487 B2* | 2/2013 | Bastide et al. | 704/3 |
| 8,442,197 B1* | 5/2013 | Mazza et al. | 379/202.01 |
| 2003/0001890 A1* | 1/2003 | Brin | 345/753 |
| 2003/0125952 A1 | 7/2003 | Engelke et al. | |
| 2005/0027802 A1* | 2/2005 | Madsen et al. | 709/204 |
| 2005/0182817 A1* | 8/2005 | Andreev et al. | 709/204 |
| 2006/0168315 A1* | 7/2006 | Daniell et al. | 709/237 |
| 2006/0284981 A1* | 12/2006 | Erol et al. | 348/207.1 |
| 2007/0038701 A1* | 2/2007 | Majors et al. | 709/204 |
| 2007/0143103 A1* | 6/2007 | Asthana et al. | 704/200 |
| 2008/0154593 A1 | 6/2008 | DaPalma et al. | |
| 2008/0181140 A1* | 7/2008 | Bangor et al. | 370/261 |
| 2008/0295040 A1* | 11/2008 | Crinon | 715/865 |
| 2009/0094288 A1* | 4/2009 | Berry et al. | 707/104.1 |
| 2009/0210803 A1* | 8/2009 | Brignull et al. | 715/757 |
| 2009/0326939 A1* | 12/2009 | Toner et al. | 704/235 |
| 2010/0169435 A1* | 7/2010 | O'Sullivan et al. | 709/206 |
| 2010/0228546 A1* | 9/2010 | Dingler et al. | 704/235 |
| 2010/0251177 A1* | 9/2010 | Geppert et al. | 715/821 |
| 2010/0268534 A1* | 10/2010 | Kishan et al. | 704/235 |
| 2011/0032845 A1* | 2/2011 | Agapi et al. | 370/260 |
| 2011/0046939 A1* | 2/2011 | Balasaygun | 704/2 |
| 2011/0112833 A1 | 5/2011 | Frankel et al. | |
| 2011/0267419 A1* | 11/2011 | Quinn et al. | 348/14.08 |
| 2012/0143605 A1* | 6/2012 | Thorsen et al. | 704/235 |
| 2012/0246229 A1* | 9/2012 | Carr et al. | 709/204 |

OTHER PUBLICATIONS http://techcrunch.com/2008/05/06/use-twitterfone-for-easy-voice-to-text-on-twitter, downloaded Nov. 3, 2011, pp. 1-4.

http://news.cnetcom/8301-27076_3-10322240-248.html, downloaded on Nov. 3, 2011, pp. 1-15.

http://messenger.yahoo.com/features/voice, downloaded on Nov. 3, 2011, pp. 1-2.

http://www.webex.com/how-it-works/for-meetings.html, downloaded on Nov. 3, 2011, pp. 1-3.

http://www-10.lotus.com/ldd/stwiki.nsf/dx/Lotus_Sametime_Telephony_8_Resources_for_users, downloaded Nov. 3, 2011, pp. 1-6.

http://explore.live.com/windows-live-messenger?os=other, downloaded Nov. 3, 2011, pp. 1.

\* cited by examiner

VOICE CONTENT TRANSCRIPTION DURING COLLABORATION SESSIONS

BACKGROUND OF THE INVENTION

Meetings, conferences, or other collaboration sessions may be conducted using unified telephony applications or Voice over Internet Protocol (VoIP) conferencing applications and/or systems. These meetings conferences, or other collaboration sessions may include participants that natively speak different languages or may be from different cultures. These participants may have difficulty understanding each other's voices and/or accents for these and other reasons. Additionally, audio quality may not be consistent in various unified telephony applications or Voice over Internet Protocol (VoIP) conferencing applications and/or systems, and may also cause participants to have difficulty understanding each other.

BRIEF SUMMARY OF THE INVENTION

In a first embodiment, a method may include receiving, via one or more computing devices, an indication to provide one or more real-time voice content-to-text content transcriptions to a first collaboration session participant. The one or more real-time voice content-to-text content transcriptions may correspond to voice content of a second collaboration session participant in one or more collaboration sessions including the first collaboration session participant and the second collaboration session participant. The method may further include defining, via the one or more computing devices, a preference for the first collaboration session participant to receive the one or more real-time voice content-to-text content transcriptions corresponding to the voice content of the second collaboration session participant in the one or more collaboration sessions including the first collaboration session participant and the second collaboration session participant based upon, at least in part, the indication. The method may also include applying, via the one or more computing devices, the preference to a first collaboration session including the first collaboration session participant and the second collaboration session participant. The method may additionally include providing, via the one or more computing devices, a first real-time voice content-to-text content transcription to the first collaboration session participant during the first collaboration session including the first collaboration session participant and the second collaboration session participant. The first real-time voice content-to-text content transcription may correspond to first voice content of the second collaboration session participant in the first collaboration session.

One or more of the following features may be included. The method may include storing the preference for the first collaboration session participant to receive the one or more real-time voice content-to-text content transcriptions corresponding to the voice content of the second collaboration session participant in the one or more collaboration sessions including the first collaboration session participant and the second collaboration session participant. The method may also include applying the preference to a second collaboration session including the first collaboration session participant and the second collaboration session participant based upon, at least in part, the stored preference. The method may additionally include providing a second real-time voice content-to-text content transcription to the first collaboration session participant during the second collaboration session including the first collaboration session participant and the second collaboration session participant. The second real-time voice content-to-text content transcription may correspond to second voice content of the second collaboration session participant in the second collaboration session. Furthermore, the method may include generating the first real-time voice content-to-text content transcription corresponding to the first voice content of the second collaboration session participant in the first collaboration session including the first collaboration session participant and the second collaboration session participant.

In an implementation, the method may include updating the first real-time voice content-to-text content transcription corresponding to the first voice content of the second collaboration session participant in the first collaboration session including the first collaboration session participant and the second collaboration session participant during the first collaboration session to include text content in the transcription that reflects additional voice content of the second collaboration session participant in the first collaboration session. The method may also include indicating to the second collaboration session participant in the first collaboration session that the first collaboration session participant in the first collaboration session has a preference to receive the one or more real-time voice content-to-text content transcriptions corresponding to the voice content of the second collaboration session participant in the one or more collaboration sessions including the first collaboration session participant and the second collaboration session participant. The indication to provide the one or more real-time voice content-to-text content transcriptions to the first collaboration session participant may be based upon, at least in part, detection of an insufficient voice-over-internet-protocol session quality associated with the second collaboration session participant in the one or more collaboration sessions. The first real-time voice content-to-text content transcription corresponding to the first voice content of the second collaboration session participant may be provided to the first collaboration session participant via a graphical user interface including text content of the transcription.

In a second embodiment, a computer program product may reside on a computer readable storage medium and may have a plurality of instructions stored on it. When executed by a processor, the instructions may cause the processor to perform operations including receiving, via one or more computing devices, an indication to provide one or more real-time voice content-to-text content transcriptions to a first collaboration session participant. The one or more real-time voice content-to-text content transcriptions may correspond to voice content of a second collaboration session participant in one or more collaboration sessions including the first collaboration session participant and the second collaboration session participant. The operations may further include defining, via the one or more computing devices, a preference for the first collaboration session participant to receive the one or more real-time voice content-to-text content transcriptions corresponding to the voice content of the second collaboration session participant in the one or more collaboration sessions including the first collaboration session participant and the second collaboration session participant based upon, at least in part, the indication. The operations may also include applying, via the one or more computing devices, the preference to a first collaboration session including the first collaboration session participant and the second collaboration session participant. The operations may additionally include providing, via the one or more computing devices, a first real-time voice content-to-text content transcription to the first collaboration session participant during the first collaboration session including the first collaboration session participant and the second collaboration session participant. The first real-time voice content-to-text content transcription may correspond to first voice content of the second collaboration session participant in the first collaboration session.

One or more of the following features may be included. The operations may include storing the preference for the first collaboration session participant to receive the one or more real-time voice content-to-text content transcriptions corresponding to the voice content of the second collaboration session participant in the one or more collaboration sessions including the first collaboration session participant and the second collaboration session participant. The operations may also include applying the preference to a second collaboration session including the first collaboration session participant and the second collaboration session participant based upon, at least in part, the stored preference. The operations may additionally include providing a second real-time voice content-to-text content transcription to the first collaboration session participant during the second collaboration session including the first collaboration session participant and the second collaboration session participant. The second real-time voice content-to-text content transcription may correspond to second voice content of the second collaboration session participant in the second collaboration session. Furthermore, the operations may include generating the first real-time voice content-to-text content transcription corresponding to the first voice content of the second collaboration session participant in the first collaboration session including the first collaboration session participant and the second collaboration session participant.

In an implementation, the operations may include updating the first real-time voice content-to-text content transcription corresponding to the first voice content of the second collaboration session participant in the first collaboration session including the first collaboration session participant and the second collaboration session participant during the first collaboration session to include text content in the transcription that reflects additional voice content of the second collaboration session participant in the first collaboration session. The operations may also include indicating to the second collaboration session participant in the first collaboration session that the first collaboration session participant in the first collaboration session has a preference to receive the one or more real-time voice content-to-text content transcriptions corresponding to the voice content of the second collaboration session participant in the one or more collaboration sessions including the first collaboration session participant and the second collaboration session participant. The indication to provide the one or more real-time voice content-to-text content transcriptions to the first collaboration session participant may be based upon, at least in part, detection of an insufficient voice-over-internet-protocol session quality associated with the second collaboration session participant in the one or more collaboration sessions. The first real-time voice content-to-text content transcription corresponding to the first voice content of the second collaboration session participant may be provided to the first collaboration session participant via a graphical user interface including text content of the transcription.

In a third embodiment, a computing system is provided. The computing system may include at least one processor and at least one memory architecture coupled with the at least one processor. The computing system may also include a first software module executable by the at least one processor and the at least one memory architecture, wherein the first software module may be configured to receive an indication to provide one or more real-time voice content-to-text content transcriptions to a first collaboration session participant. The one or more real-time voice content-to-text content transcriptions may correspond to voice content of a second collaboration session participant in one or more collaboration sessions including the first collaboration session participant and the second collaboration session participant. Further, the computing system may include a second software module which may be configured define a preference for the first collaboration session participant to receive the one or more real-time voice content-to-text content transcriptions corresponding to the voice content of the second collaboration session participant in the one or more collaboration sessions including the first collaboration session participant and the second collaboration session participant based upon, at least in part, the indication. Additionally, the computing system may include a third software module which may be configured to apply the preference to a first collaboration session including the first collaboration session participant and the second collaboration session participant. Moreover, the computing system may include a fourth software module which may be configured to provide a first real-time voice content-to-text content transcription to the first collaboration session participant during the first collaboration session including the first collaboration session participant and the second collaboration session participant. The first real-time voice content-to-text content transcription may correspond to first voice content of the second collaboration session participant in the first collaboration session.

One or more of the following features may be included. The computing system may include a fifth software module which may be configured to store the preference for the first collaboration session participant to receive the one or more real-time voice content-to-text content transcriptions corresponding to the voice content of the second collaboration session participant in the one or more collaboration sessions including the first collaboration session participant and the second collaboration session participant. The computing system may also include a sixth software module which may be configured to apply the preference to a second collaboration session including the first collaboration session participant and the second collaboration session participant based upon, at least in part, the stored preference. The computing system may additionally include a seventh software module which may be configured to provide a second real-time voice content-to-text content transcription to the first collaboration session participant during the second collaboration session including the first collaboration session participant and the second collaboration session participant. The second real-time voice content-to-text content transcription may correspond to second voice content of the second collaboration session participant in the second collaboration session. Furthermore, the computing system may include an eighth software module which may be configured to generate the first real-time voice content-to-text content transcription corresponding to the first voice content of the second collaboration session participant in the first collaboration session including the first collaboration session participant and the second collaboration session participant.

The details of one or more implementations are set forth in the accompanying drawings and the description below. Other features and advantages will become apparent from the description, the drawings, and the claims.

DETAILED DESCRIPTION OF THE INVENTION

Figure 1:
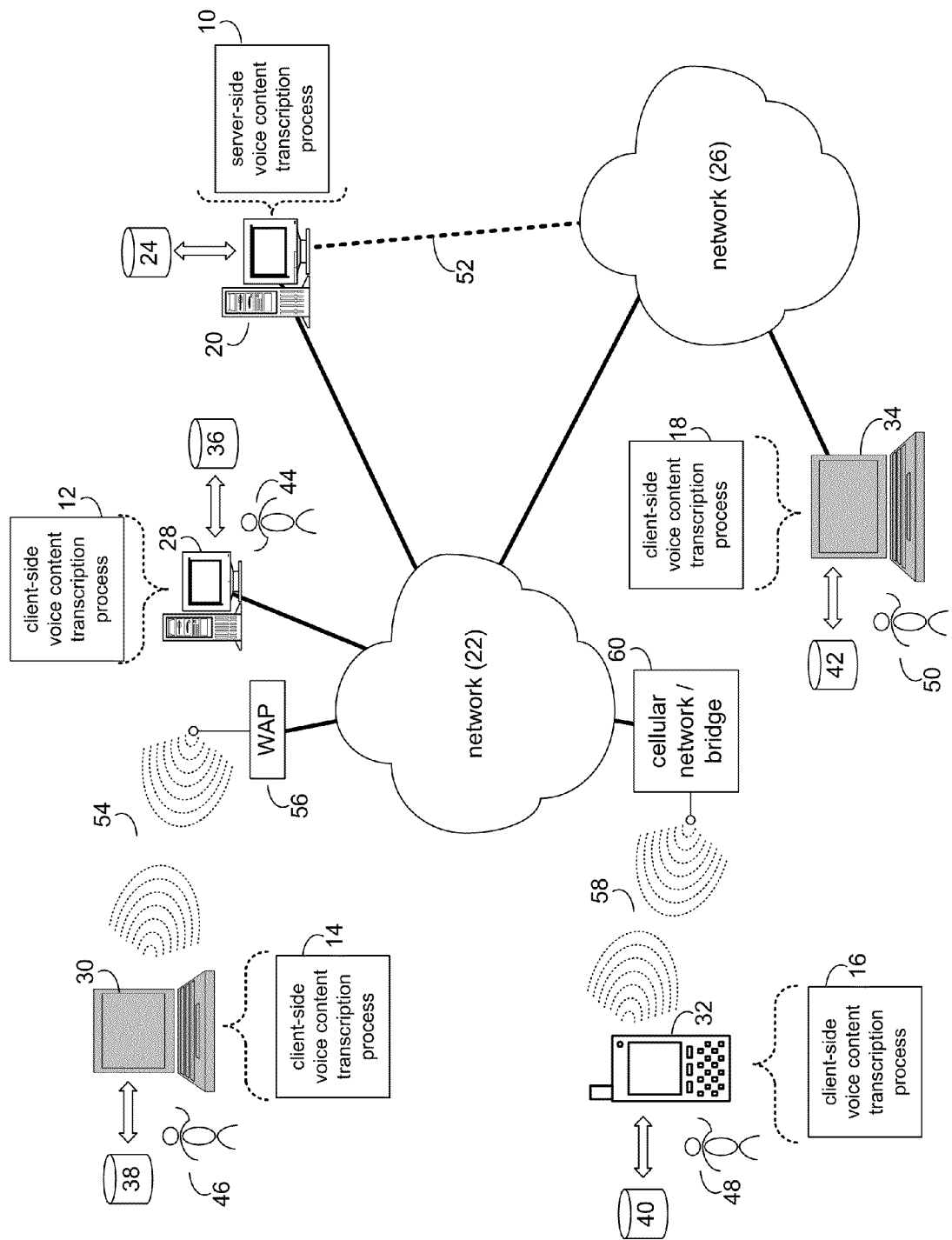
FIG. 1 is a diagrammatic view of a voice content transcription process coupled to a distributed computing network.
Figure 2:
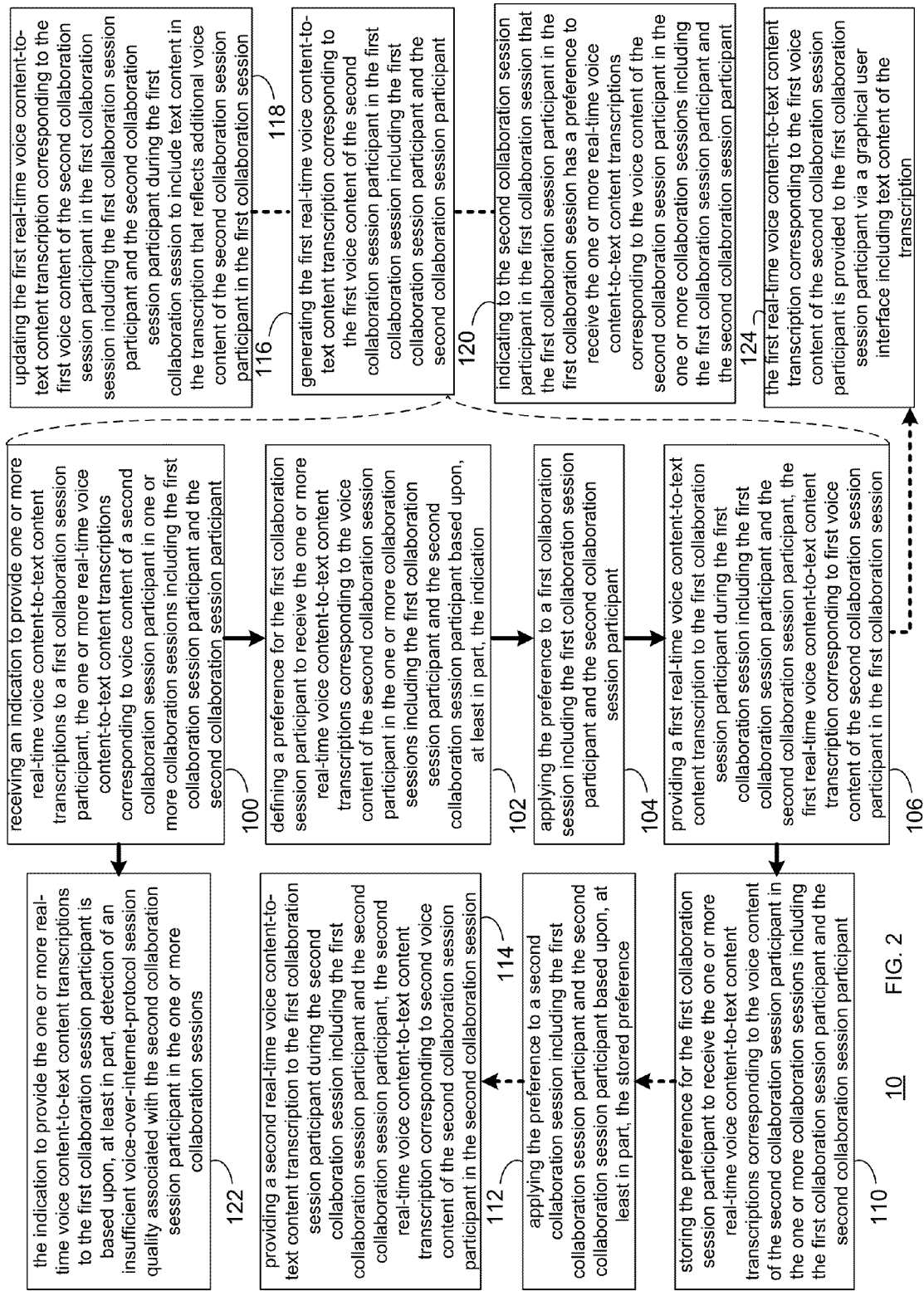
FIG. 2 is a flowchart of the voice content transcription process of FIG. 1.

Referring to FIGS. 1 & 2, there is shown a voice content transcription process 10. As will be discussed below, voice content transcription process 10 may receive 100 an indication to provide one or more real-time voice content-to-text content transcriptions to a first collaboration session participant. The one or more real-time voice content-to-text content transcriptions may correspond to voice content of a second collaboration session participant in one or more collaboration sessions including the first collaboration session participant and the second collaboration session participant. Voice content transcription process 10 may also define 102 a preference for the first collaboration session participant to receive the one or more real-time voice content-to-text content transcriptions corresponding to the voice content of the second collaboration session participant in the one or more collaboration sessions including the first collaboration session participant and the second collaboration session participant based upon, at least in part, the indication. Voice content transcription process 10 may further apply 104 the preference to a first collaboration session including the first collaboration session participant and the second collaboration session participant. Additionally voice content transcription process 10 may provide 106 a first real-time voice content-to-text content transcription to the first collaboration session participant during the first collaboration session including the first collaboration session participant and the second collaboration session participant. The first real-time voice content-to-text content transcription may correspond to first voice content of the second collaboration session participant in the first collaboration session.

The Voice content transcription (VCT) process may be a server-side process (e.g., server-side VCT process 10), a client-side process (e.g., client-side VCT process 12, client-side VCT process 14, client-side VCT process 16, or client-side VCT process 18), or a hybrid server-side/client-side process (e.g., the combination of server-side VCT process 10 and one or more of client-side VCT processes 12, 14, 16, 18).

Server-side VCT process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft Windows Server; Novell Netware; or Red Hat Linux, for example.

The instruction sets and subroutines of server-side VCT process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft IIS, Novell Web Server, or Apache Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side VCT processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft Windows, Microsoft Windows CE, Red Hat Linux, or a custom operating system.

The instruction sets and subroutines of client-side VCT processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side VCT processes 12, 14, 16, 18 and/or server-side VCT process 10 may be processes that run within (i.e., are part of) a unified communications and collaboration application configured for unified telephony and/or VoIP conferencing (e.g., Lotus® Sametime®). Alternatively, client-side VCT processes 12, 14, 16, 18 and/or server-side VCT process 10 may be stand-alone applications that work in conjunction with the unified communications and collaboration application. One or more of client-side VCT processes 12, 14, 16, 18 and server-side VCT process 10 may interface with each other (via network 22 and/or network 26). The unified communications and collaboration application may be a unified telephony application and/or a VoIP conferencing application. VCT process 10 may also run within any e-meeting application, web-conferencing application, or teleconferencing application configured for handling IP telephony and/or VoIP conferencing.

Users 44, 46, 48, 50 may access server-side VCT process 10 directly through the device on which the client-side VCT process (e.g., client-side VCT processes 12, 14, 16, 18) is executed, namely client electronic devices 28, 30, 32, 34, for example. Users 44, 46, 48, 50 may access server-side VCT process 10 directly through network 22 and/or through secondary network 26. Further, server computer 20 (i.e., the computer that executes server-side VCT process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Voice Content Transcription (VCT) Process

For the following discussion, server-side VCT process 10 will be described for illustrative purposes. It should be noted that client-side VCT process 12 may interact with server-side VCT process 10 and may be executed within one or more applications that allow for communication with client-side VCT process 12. However, this is not intended to be a limitation of this disclosure, as other configurations are possible (e.g., stand-alone, client-side VCT processes and/or stand-alone server-side VCT processes.) For example, some implementations may include one or more of client-side VCT processes 12, 14, 16, 18 in place of or in addition to server-side VCT process 10.

Figure 3:
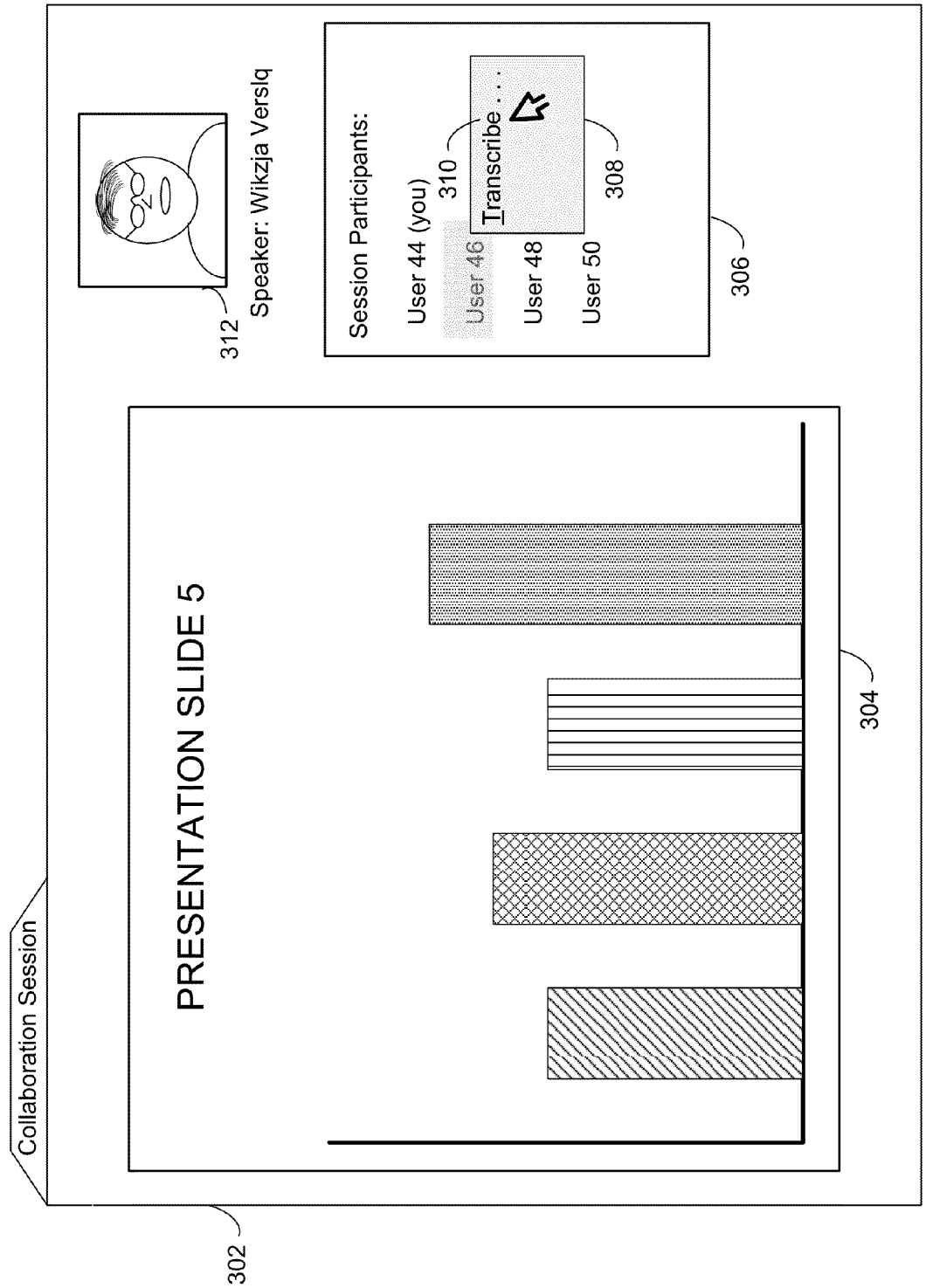
FIG. 3 an example graphical user interface which may be associated with the voice content transcription process of FIG. 1.

Referring now to FIGS. 1-3, one or more of users 44, 46, 48, and 50 may be in a collaboration session (e.g., collaboration session 300). Collaboration session 300 may be conducted via a unified communications and collaboration application which may be configured for unified telephony and/or VoIP (Voice-over-Internet-Protocol) conferencing and may be a unified telephony application and/or a VoIP conferencing application (e.g., Lotus® Sametime®). Collaboration session 300 may be a conference, meeting, presentation, or other type of collaborative gathering. Further, collaboration session 300 may be attended online, and audio associated with collaboration session 300 may be transmitted to the one or more collaboration session participants (e.g., one or more of users 44, 46, 48, 50). In an implementation, audio associated with collaboration session 300 may be streamed to many collaboration session participants (e.g., one or more of users 44, 46, 48, 50) or may be accessed via a unified telephony application and/or a VoIP conferencing application. In an implementation, audio associated with collaboration session 300 may also be transmitted over a traditional phone line. While collaboration session 300 may be described herein as being a meeting-type online collaboration with associated presentation content (e.g., presentation content 304), this for illustrative purposes only, and collaboration session 300 may be any type of voice conference using VoIP, a traditional phone line, or a combination of VoIP and a traditional phone line.

A participant of collaboration session 300 (e.g., one or more of users 44, 46, 48, 50) may establish, via a unified telephony application and/or a VoIP conferencing application, a VoIP session between the unified telephony application and/or a VoIP conferencing application server (e.g., server computer 20) and a corresponding unified telephony application and/or a VoIP conferencing application client (e.g., one or more of client electronic devices 28, 30, 32, 34). The VoIP session may be a line through which the participant of collaboration session 300 (e.g., one or more of users 44, 46, 48, 50) may transmit and receive communications to and from other participants of collaboration session 300. In other words, if there are 10 participants in collaboration session 300, each participant may establish, via the unified telephony application and/or a VoIP conferencing application and/or their corresponding unified telephony application and/or a VoIP conferencing application client, a VoIP session with the unified telephony application and/or a VoIP conferencing application server, and there may be 10 VoIP sessions, one for each participant of collaboration session 300.

For example, user 44 may make a communication to other participants of collaboration session 300 by speaking into a microphone (not shown) operatively coupled to user 44's unified telephony application and/or a VoIP conferencing application client (e.g., client electronic device 28). The communication may be received by the unified telephony application and/or a VoIP conferencing application server (e.g., server computer 20) via the VoIP session.

Assume for illustrative purposes that user 44 and user 46 are in collaboration session 300 as shown in FIG. 3. Further, assume for illustrative purposes that user 46 is "Wikzja Verslq" as shown in graphic 312 of graphical user interface (GUI) 302. GUI 302 may be available from the unified telephony application and/or VoIP conferencing application used for collaboration session 300, and user 44 may participate in collaboration session 300 via, at least in part, GUI 302. User 44 may be participating in collaboration session 300 and may be listening to voice content spoken by user 46, e.g., "Wikzja Verslq". The voice content of user 46 may be received, processed, transmitted, and/or rendered by the unified telephony application and/or VoIP conferencing application used for collaboration session 300.

User 46 may not be a native speaker of the language through which the participants (e.g., users 44, 46, 48, 50) of collaboration session 300 are speaking. As such, voice content of user 46 may not be clearly heard or understood by one or more of users 44, 48, and/or 50 participating in collaboration session 300. In order to more clearly understand user 46, user 44 may desire a voice content-to-text content transcription of user 46's speech so that user 44 may read text representative of user 46's speech. In order to indicate that user 44 desire's the voice content-to-text content transcription, user 44 may, for example, select (e.g., right-click) on user 46 in a session participant list (e.g., session participant list 306) provided by the unified telephony application and/or VoIP conferencing application used for collaboration session 300. In response to receiving this selection from user 44, VCT process 10 may render pop-up interface 308 which may include a selectable "transcribe" option (e.g., option 310). User 44 may select the "transcribe" option (e.g., option 310).

In this way, for example and without limitation, VCT process 10 may receive 100 an indication (e.g., in response to receiving user 44's selection of option 310) to provide one or more real-time voice content-to-text content transcriptions to a first collaboration session participant (e.g., user 44). The one or more real-time voice content-to-text content transcriptions may correspond to voice content (e.g., spoken by user 46) of a second collaboration session participant (e.g., user 46) in one or more collaboration sessions (e.g., collaboration session 300). The one or more collaboration sessions (e.g., collaboration session 300) may include the first collaboration session participant (e.g., user 44) and the second collaboration session participant (e.g., user 46).

Figure 4:
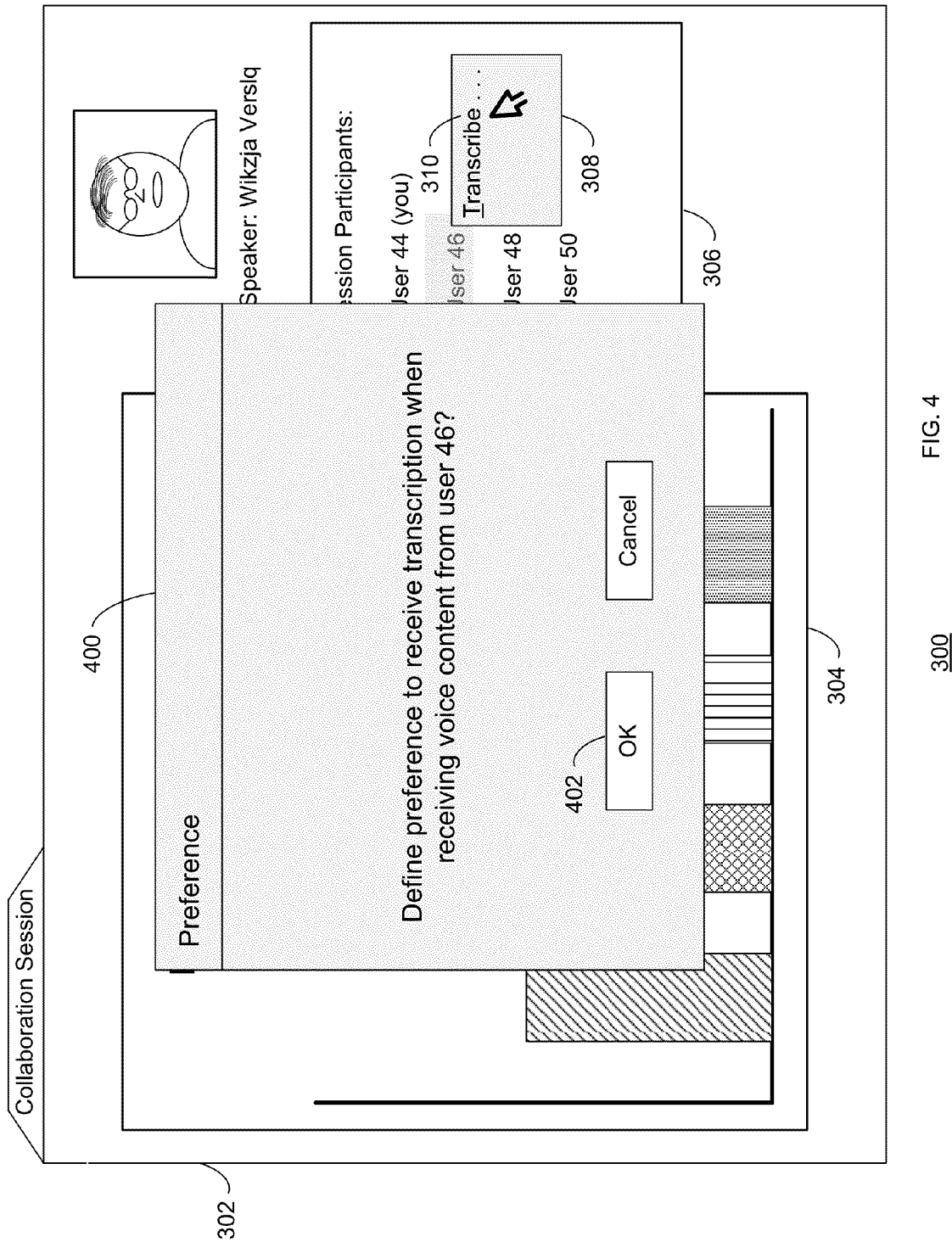
FIG. 4 is also an example graphical user interface which may be associated with the voice content transcription process of FIG. 1.

Referring now also to FIG. 4, VCT process 10 may define 102 a preference (e.g., via pop-up interface 400) for the first collaboration session participant (e.g., user 44) to receive the one or more real-time voice content-to-text content transcriptions corresponding to the voice content (e.g., spoken by user 46) of the second collaboration session participant (e.g., user 46) in the one or more collaboration sessions (e.g., collaboration session 300) including the first collaboration session participant (e.g., user 44) and the second collaboration session participant (e.g., user 46) based upon, at least in part, the indication (e.g., received in response to receiving user 44's selection of option 310). In an implementation, VCT process 10 may automatically define the preference in response to receiving user 44's selection of option 310. In an implementation, VCT process 10 may render pop-up interface 400 in response to receiving user 44's selection of option 310. User 44 may select option 402 to define the preference to receive the one or more real-time voice content-to-text content transcriptions corresponding to the voice content (e.g., spoken by user 46) of the second collaboration session participant (e.g., user 46), for example, each time user 44 and user 46 are participating in the same collaboration session. In response to receiving user 44's selection of option 402, VCT process 10 may define the preference of user 44 to receive the one or more real-time voice content-to-text content transcriptions corresponding to the voice content (e.g., spoken by user 46) of the second collaboration session participant (e.g., user 46).

Further, VCT process 10 may store 110 the preference (e.g., received in response to receiving user 44's selection of option 310 or via pop-up interface 400) for the first collaboration session participant (e.g., user 44) to receive the one or more real-time voice content-to-text content transcriptions corresponding to the voice content (e.g., spoken by user 46) of the second collaboration session participant (e.g., user 46) in the one or more collaboration sessions (e.g., collaboration session 300) including the first collaboration session participant (e.g., user 44) and the second collaboration session participant (e.g., user 46). The preference may be stored in, e.g., one or more of storage devices 24, 36, 38, 40, and/or 42 or a database, any of which may be associated with the unified telephony application and/or VoIP conferencing application. In this way, VCT process 10 may persist the preference for user 44 during current and/or future collaboration sessions involving both users 44 and 46.

Figure 5:
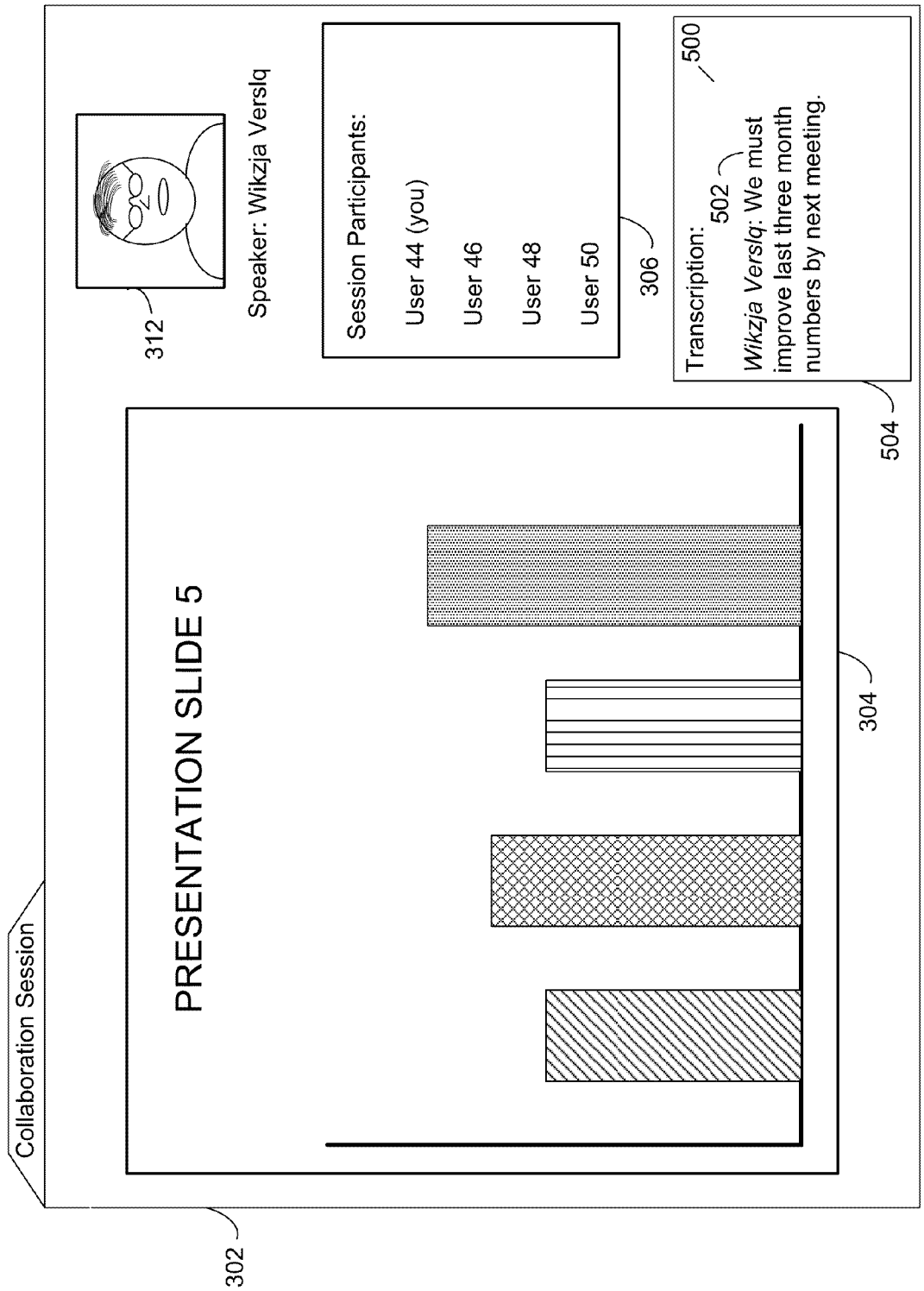
FIG. 5 is also an example graphical user interface which may be associated with the voice content transcription process of FIG. 1.

VCT process 10 may also apply 104 the preference (e.g., received in response to receiving user 44's selection of option 310 or via pop-up interface 400) to a first collaboration session (e.g., collaboration session 300) including the first collaboration session participant (e.g., user 44) and the second collaboration session participant (e.g., user 46). For example, and referring now also to FIG. 5, VCT process 10 may generate 116 the first real-time voice content-to-text content transcription (e.g., transcription 500) corresponding to the first voice content (e.g., spoken by user 46) of the second collaboration session participant (e.g., user 46) in the first collaboration session (e.g., collaboration session 300) including the first collaboration session participant (e.g., user 44) and the second collaboration session participant (e.g., user 46).

In an implementation, VCT process 10 may include an active listener such as, and for example, an agent or a plug-in, which may be configured to sample voice content of one or more collaboration session participants. VCT process 10 may use the active listener, at least in part, to assist VCT process 10 in generating the first real-time voice content-to-text content transcription (e.g., transcription 500). In an embodiment, VCT process 10 may also use, at least in part, active face recognition to facilitate lip reading for ease of comprehension.

Additionally, VCT process 10 may provide 106 a first real-time voice content-to-text content transcription (e.g., transcription 500) to the first collaboration session participant (e.g., user 44) during the first collaboration session (e.g., collaboration session 300) including the first collaboration session participant (e.g., user 44) and the second collaboration session participant (e.g., user 46). The first real-time voice content-to-text content transcription (e.g., transcription 500) may correspond to first voice content (e.g., spoken by user 46) of the second collaboration session participant (e.g., user 46) in the first collaboration session (e.g., collaboration session 300). For example, the first real-time voice content-to-text content transcription (e.g., transcription 500) corresponding to the first voice content (e.g., spoken by user 46) of the second collaboration session participant (e.g., user 46) may be (124) provided to the first collaboration session participant (e.g., user 44) via a graphical user interface (e.g., pop-up interface 504) including text content (e.g., text content 502) of the transcription (e.g., transcription 500). In an implementation, VCT process 10 may render a pop-up window (e.g., pop-up interface 504) to display transcription 500 to user 44. In this way, VCT process 10 may facilitate ease of comprehension of user 46's speech for user 44 during collaboration session 300.

It should be noted that, as used herein, the term "real-time" may refer to a time proximate to when user 46's voice content is rendered for user 44 by, e.g., the unified telephony application and/or VoIP conferencing application used for collaboration session 300. In other words, VCT process 10 may provide text content 502 in real-time to user 44 by providing text content 502 to user 44 at a time proximate to when the unified telephony application and/or VoIP conferencing application renders user 46's voice content that corresponds to text content 502 on a client electronic device associated with user 44 (e.g., client electronic device 28). The term "real-time voice content-to-text content transcription" as user herein may refer to a transcription (e.g., transcription 500) including text content (e.g., text content 502) representing voice content (e.g., spoken by user 46) configured to be provided to a first collaboration session participant (e.g., user 44) at a time proximate to when a second collaboration session participant's (e.g., user 46's) voice content is rendered for the first collaboration session participant (e.g., user 44) by, e.g., the unified telephony application and/or VoIP conferencing application used for collaboration session 300.

For example, in an implementation, VCT process 10 may piggy-back text content 502 with voice content transmitted via a VoIP session associated with user 46. In this way, VCT process 10 may have text content 502 attach to the corresponding voice content such that both text content 502 and the corresponding voice content reach user 44 are provided are in real-time.

Figure 6:
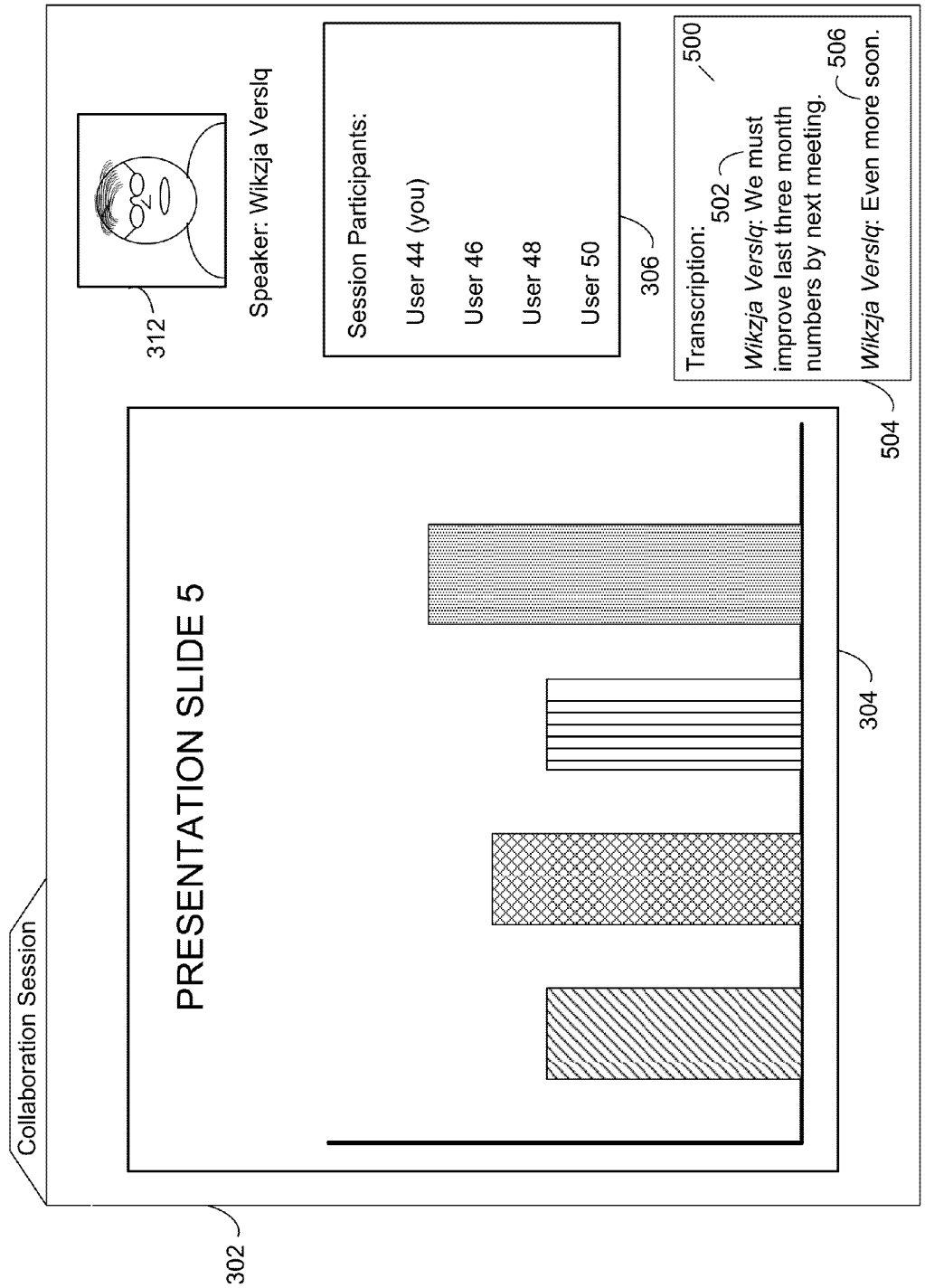
FIG. 6 is also an example graphical user interface which may be associated with the voice content transcription process of FIG. 1.

Additionally, and referring now also to FIG. 6, VCT process 10 may update 118 the first real-time voice content-to-text content transcription (e.g., transcription 500) corresponding to the first voice content (e.g., spoken by user 46) of the second collaboration session participant (e.g., user 46) in the first collaboration session (e.g., collaboration session 300) including the first collaboration session participant (e.g., user 44) and the second collaboration session participant (e.g., user 46) during the first collaboration session (e.g., collaboration session 300). For example, VCT process 10 may update transcription 500 to include text content (e.g., text content 506) in the transcription (e.g., transcription 500) that reflects additional voice content (e.g., spoken by user 46) of the second collaboration session participant (e.g., user 46) in the first collaboration session (e.g., collaboration session 300).

It should be noted that while VCT process 10 may be described herein has transcribing voice content for one collaboration session participant (e.g., user 46) in order to provide the corresponding transcription to another collaboration session participant (e.g., user 44), this is not meant to be a limitation of the present disclosure. For example, a collaboration session may include multiple collaboration session participants, any number of which may be difficult for user 44 to understand. As such, VCT process 10 may provide transcriptions of voice content associated with multiple collaboration session participants in the collaboration session (e.g., collaboration session 300) to user 44 upon request. Further, it should be noted that VCT process 10 may display text content associated with the first real-time voice content-to-text content transcription (e.g., transcription 500) in a chronological sequence corresponding to an order in which the corresponding voice content was spoken. The speaker's (e.g., user 46's) name or username may be highlighted or otherwise specially marked in transcription 500 so that the requesting participant (e.g., user 44) may know who spoke. In an embodiment, a server computer (e.g., server computer 20) associated with the unified telephony application and/or VoIP conferencing application used for collaboration session 300 may manage multiple requests for real-time voice content-to-text content transcriptions during collaboration session 300 and may provide multiple real-time voice content-to-text content transcriptions to different participants during the same collaboration session based upon, at least in part, one or more received indications.

Figure 7:
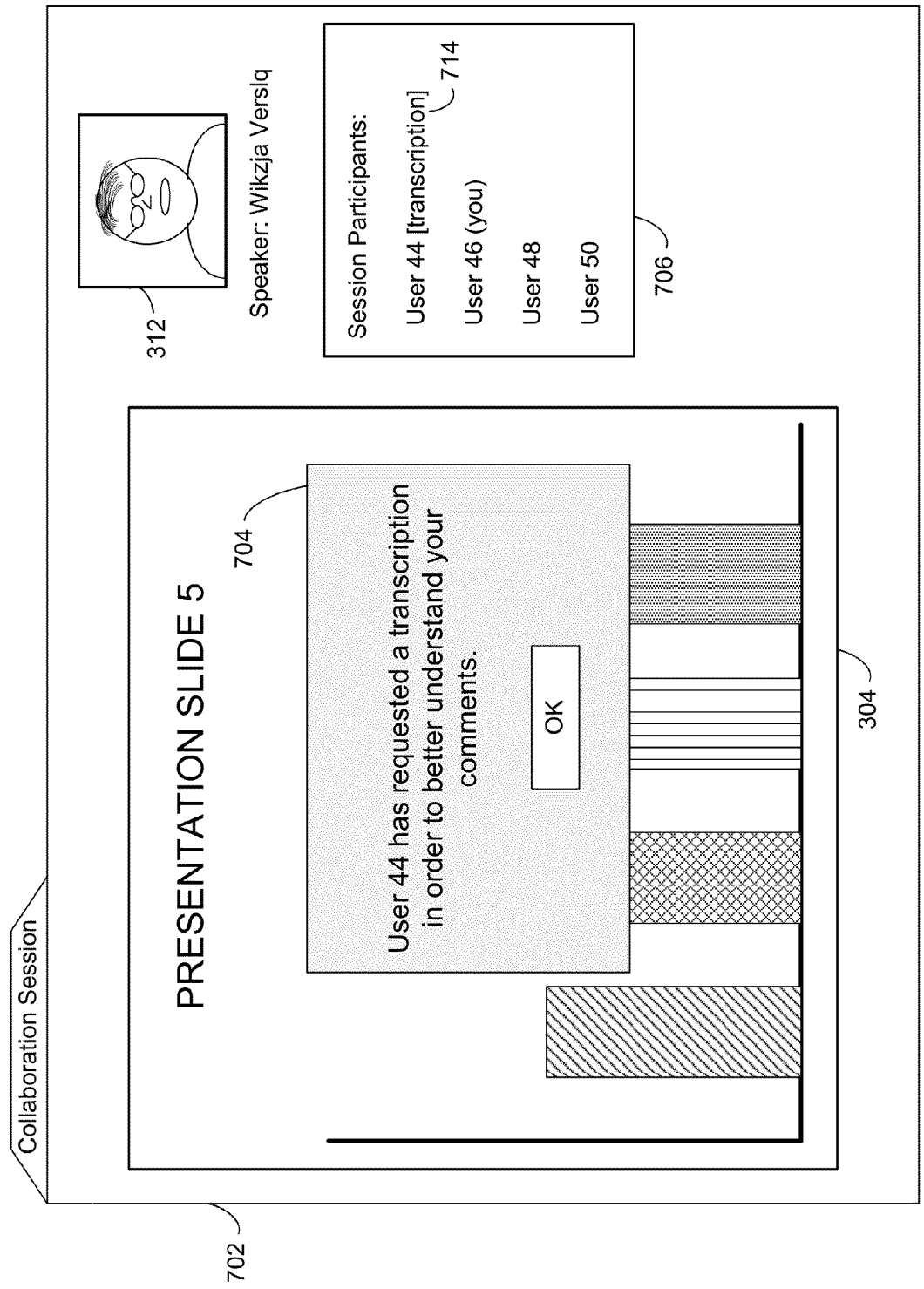
FIG. 7 is also an example graphical user interface which may be associated with the voice content transcription process of FIG. 1.

Referring now also to FIG. 7, VCT process 10 may indicate 120 to the second collaboration session participant (e.g., user 46) in the first collaboration session (e.g., collaboration session 300) that the first collaboration session participant (e.g., user 44) in the first collaboration session (e.g., collaboration session 300) has a preference to receive the one or more real-time voice content-to-text content transcriptions (e.g., transcription 500) corresponding to the voice content (e.g. spoken by user 46) of the second collaboration session participant (e.g., user 46) in the one or more collaboration sessions (e.g., collaboration session 300) including the first collaboration session participant (e.g., user 44) and the second collaboration session participant (e.g., user 46). Assume for illustrative purposes that GUI 702 may be available from the unified telephony application and/or VoIP conferencing application used for collaboration session 300, and that user 46 may participate in collaboration session 300 via, at least in part, GUI 402. VCT process 10 may, for example, render pop-up interface 704 which may indicate to user 46 that user 44 has requested a transcription of user 46's voice content. In an embodiment, VCT process 10 may indicate that user 44 has requested the transcription via session participant list 706, as shown in by indicator 714 in FIG. 7.

Figure 8:
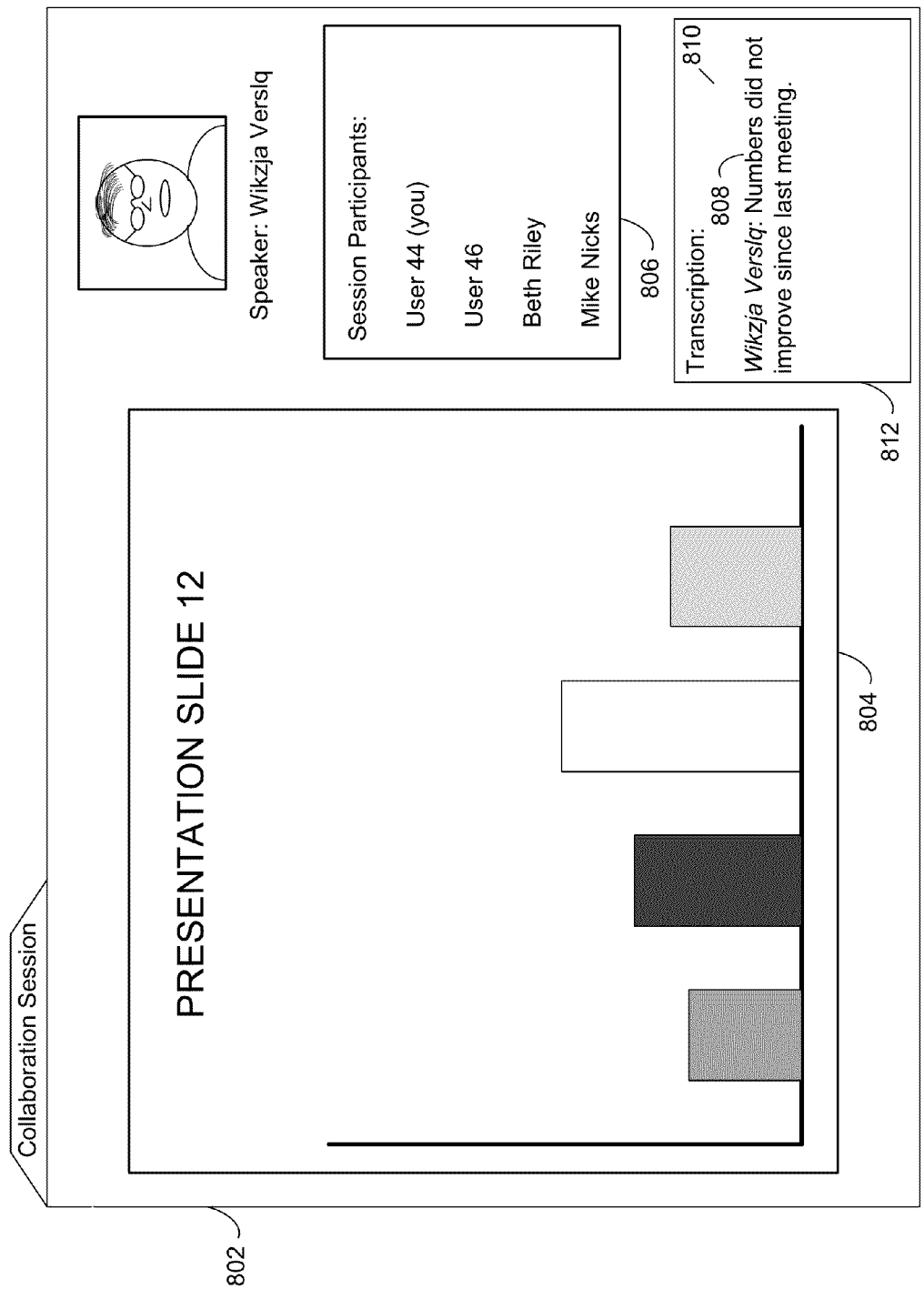
FIG. 8 is also an example graphical user interface which may be associated with the voice content transcription process of FIG. 1.

Referring now also to FIG. 8, in an embodiment, VCT process 10 may apply 112 the preference (e.g., received in response to receiving user 44's selection of option 310 or via pop-up interface 400) to a second collaboration session (e.g., collaboration session 800) including the first collaboration session participant (e.g., user 44) and the second collaboration session participant (e.g., user 46) based upon, at least in part, the stored preference (e.g., received in response to receiving user 44's selection of option 310 or via pop-up interface 400). Further, VCT process 10 may provide 114 a second real-time voice content-to-text content transcription (e.g., transcription 810) to the first collaboration session participant (e.g., user 44) during the second collaboration session (e.g., collaboration session 800) including the first collaboration session participant (e.g., user 44) and the second collaboration session participant (e.g., user 46). The second real-time voice content-to-text content transcription (e.g., transcription 810) may correspond to second voice content (e.g., spoken by user 46) of the second collaboration session participant (e.g., user 46) in the second collaboration session (e.g., collaboration session 800). In this way, VCT process 10 may allow user 44 to receive real-time voice content-to-text content transcriptions of user 46's voice content each time user 44 and user 46 are both in the same collaboration session, without user 44 having to request a real-time voice content-to-text content transcription each time user 46 is encountered in a collaboration session, based upon, at least in part, the defined preference.

For example, the second real-time voice content-to-text content transcription (e.g., transcription 810) corresponding to the second voice content (e.g., spoken by user 46) of the second collaboration session participant (e.g., user 46) may be provided to the first collaboration session participant (e.g., user 44) via a graphical user interface (e.g., pop-up interface 812) including text content (e.g., text content 808) of the transcription (e.g., transcription 810). In an implementation, VCT process 10 may render a pop-up window (e.g., pop-up interface 812) to display transcription 810 to user 44.

In an implementation, the indication to provide the one or more real-time voice content-to-text content transcriptions (e.g., transcriptions 500, 810) to the first collaboration session participant (e.g., user 44) may be (122) based upon, at least in part, detection of an insufficient voice-over-internet-protocol session quality associated with the second collaboration session participant (e.g., user 46) in the one or more collaboration sessions (e.g., collaboration sessions 300, 800). For example, VCT process 10 may process and/or perform line quality tests on collaboration session 300 and individual VoIP sessions associated with each participant (e.g., user 46). If the line quality for one or more users is insufficient based upon, at least in part one or more line quality thresholds and/or line quality metrics measured, VCT process 10 may receive the indication to provide the one or more real-time voice content-to-text content transcriptions (e.g., transcriptions 500, 810) to a first collaboration session participant (e.g., user 44). In other words, VCT process 10 may automatically detect an insufficient voice-over-internet-protocol session quality associated with one or more collaboration session participants and provide one or more real-time voice content-to-text content transcriptions based upon, at least in part, the detection.

Further, in an implementation, VCT process 10 may convert slang and/or culture specific words or phrases into more easily understood words or phrases and may include these conversions in the one or more real-time voice content-to-text content transcriptions (e.g., transcription 500, 810). Further if one or more participants are in a different time zone, VCT process 10 may calculate one or more time zone differences, and may send one or more converted times to different owners in different time zones. The one more converted times may be included in transcriptions 500, 820. For example, if user 46 is in a time zone five hours ahead of user 44, VCT process 10 may convert a proposed time (6:00pm) spoken by user 46 to reflect the proposed time in user 44's time zone (e.g., 1:00pm).

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium (s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A method comprising:

receiving, via one or more computing devices, an indication to provide one or more real-time voice content-to-text content transcriptions to a first collaboration session participant of a plurality of collaboration session participants, the one or more real-time voice content-to-text content transcriptions corresponding to voice content of a second collaboration session participant in one or more collaboration sessions including the first collaboration session participant and the second collaboration session participant, wherein each of the plurality of collaboration session participants selects, via a graphical user interface, which of the other plurality of collaboration session participants displayed on the graphical user interface to receive the one or more real-time voice content-to-text content transcriptions for;

defining, via the one or more computing devices, a preference for the first collaboration session participant to receive the one or more real-time voice content-to-text content transcriptions corresponding to the voice content of the second collaboration session participant in the one or more collaboration sessions including the first collaboration session participant and the second collaboration session participant based upon, at least in part, the indication;

applying, via the one or more computing devices, the preference to a first collaboration session including the first collaboration session participant and the second collaboration session participant and to each subsequent collaboration session including the first collaboration session participant and the second collaboration session participant, wherein the preference is applied to each subsequent collaboration session based upon, at least in part, participants of the subsequent collaboration;

providing, via the one or more computing devices, a first real-time voice content-to-text content transcription to the first collaboration session participant during the first collaboration session including the first collaboration session participant and the second collaboration session participant, the first real-time voice content-to-text content transcription corresponding to first voice content of the second collaboration session participant in the first collaboration session, wherein the first collaboration session participant only receives the one or more real-time voice content-to-text content transcriptions for each participant of the plurality of participants that the first collaboration session participant selected via the graphical user interface: and indicating to the second collaboration session participant in the first collaboration session via a pop up interface appearing on the original graphical user interface that the first collaboration session participant in the first collaboration session has requested transcription of the first voice content of the second collaboration session participant.

2. The method of claim 1, further comprising:

storing the preference for the first collaboration session participant to receive the one or more real-time voice content-to-text content transcriptions corresponding to the voice content of the second collaboration session participant in the one or more collaboration sessions including the first collaboration session participant and the second collaboration session participant.

3. The method of claim 2, further comprising:

providing a second real-time voice content-to-text content transcription to the first collaboration session participant during a second collaboration session including the first collaboration session participant and the second collaboration session participant, the second real-time voice content-to-text content transcription corresponding to second voice content of the second collaboration session participant in the second collaboration session.

4. The method of claim 1, further comprising:

generating the first real-time voice content-to-text content transcription corresponding to the first voice content of the second collaboration session participant in the first collaboration session including the first collaboration session participant and the second collaboration session participant.

5. The method of claim 1, further comprising:

updating the first real-time voice content-to-text content transcription corresponding to the first voice content of the second collaboration session participant in the first collaboration session including the first collaboration session participant and the second collaboration session participant during the first collaboration session to include text content in the transcription that reflects additional voice content of the second collaboration session participant in the first collaboration session.

6. The method of claim 1, wherein the indication to provide the one or more real-time voice content-to-text content transcriptions to the first collaboration session participant is based upon, at least in part, detection of an insufficient voice-over-internet-protocol session quality associated with the second collaboration session participant in the one or more collaboration sessions.

7. The method of claim 1, wherein the first real-time voice content-to-text content transcription corresponding to the first voice content of the second collaboration session participant is provided to the first collaboration session participant via the graphical user interface including text content of the transcription.

8. A computer program product residing on a non-transitory computer readable storage medium having a plurality of instructions stored thereon, which, when executed by a processor, cause the processor to perform operations comprising:

receiving, via one or more computing devices, an indication to provide one or more real-time voice content-to-text content transcriptions to a first collaboration session participant of a plurality of collaboration session participants, the one or more real-time voice content-to-text content transcriptions corresponding to voice content of a second collaboration session participant in one or more collaboration sessions including the first collaboration session participant and the second collaboration session participant, wherein each of the plurality of collaboration session participants selects, via a graphical user interface, which of the other plurality of collaboration session participants displayed on the graphical user interface to receive the one or more real-time voice content-to-text content transcriptions for;

defining, via the one or more computing devices, a preference for the first collaboration session participant to receive the one or more real-time voice content-to-text content transcriptions corresponding to the voice content of the second collaboration session participant in the one or more collaboration sessions including the first collaboration session participant and the second collaboration session participant based upon, at least in part, the indication;

applying, via the one or more computing devices, the preference to a first collaboration session including the first collaboration session participant and the second collaboration session participant and to each subsequent collaboration session including the first collaboration session participant and the second collaboration session participant, wherein the preference is applied to each subsequent collaboration session based upon, at least in part, participants of the subsequent collaboration;

providing, via the one or more computing devices, a first real-time voice content-to-text content transcription to the first collaboration session participant during the first collaboration session including the first collaboration session participant and the second collaboration session participant, the first real-time voice content-to-text content transcription corresponding to first voice content of the second collaboration session participant in the first collaboration session, wherein the first collaboration session participant only receives the one or more real-time voice content-to-text content transcriptions for each participant of the plurality of participants that the first collaboration session participant selected via the graphical user interface; and indicating to the second collaboration session participant in the first collaboration session via a pop up interface appearing on the original graphical user interface that the first collaboration session participant in the first collaboration session has requested transcription of the first voice content of the second collaboration session participant.

9. The computer program product of claim 8, further comprising:

storing the preference for the first collaboration session participant to receive the one or more real-time voice content-to-text content transcriptions corresponding to the voice content of the second collaboration session participant in the one or more collaboration sessions including the first collaboration session participant and the second collaboration session participant.

10. The computer program product of claim 9, further comprising:

providing a second real-time voice content-to-text content transcription to the first collaboration session participant during a second collaboration session including the first collaboration session participant and the second collaboration session participant, the second real-time voice content-to-text content transcription corresponding to second voice content of the second collaboration session participant in the second collaboration session.

11. The computer program product of claim 8, further comprising:

generating the first real-time voice content-to-text content transcription corresponding to the first voice content of the second collaboration session participant in the first collaboration session including the first collaboration session participant and the second collaboration session participant.

12. The computer program product of claim 8, further comprising:

updating the first real-time voice content-to-text content transcription corresponding to the first voice content of the second collaboration session participant in the first collaboration session including the first collaboration session participant and the second collaboration session participant during the first collaboration session to include text content in the transcription that reflects additional voice content of the second collaboration session participant in the first collaboration session.

13. The computer program product of claim 8, wherein the indication to provide the one or more real-time voice content-to-text content transcriptions to the first collaboration session participant is based upon, at least in part, detection of an insufficient voice-over-internet-protocol session quality associated with the second collaboration session participant in the one or more collaboration sessions.

14. The computer program product of claim 8, wherein the first real-time voice content-to-text content transcription corresponding to the first voice content of the second collaboration session participant is provided to the first collaboration session participant via the graphical user interface including text content of the transcription.

15. A computing system comprising:

at least one processor;

at least one memory architecture coupled with the at least one processor;

a first software module executable by the at least one processor and the at least one memory architecture, wherein the first software module is configured to receive an indication to provide one or more real-time voice content-to-text content transcriptions to a first collaboration session participant of a plurality of collaboration session participants, the one or more real-time voice content-to-text content transcriptions corresponding to voice content of a second collaboration session participant in one or more collaboration sessions including the first collaboration session participant and the second collaboration session participant, wherein each of the plurality of collaboration session participants selects, via a graphical user interface, which of the other plurality of collaboration session participants displayed on the graphical user interface to receive the one or more real-time voice content-to-text content transcriptions for;

a second software module executable by the at least one processor and the at least one memory architecture, wherein the second software module is configured to define a preference for the first collaboration session participant to receive the one or more real-time voice content-to-text content transcriptions corresponding to the voice content of the second collaboration session participant in the one or more collaboration sessions including the first collaboration session participant and the second collaboration session participant based upon, at least in part, the indication;

a third software module executable by the at least one processor and the at least one memory architecture, wherein the third software module is configured to apply the preference to a first collaboration session including the first collaboration session participant and the second collaboration session participant and to each subsequent collaboration session including the first collaboration session participant and the second collaboration session participant, wherein the preference is applied to each subsequent collaboration session based upon, at least in part, participants of the subsequent collaboration;

a fourth software module executable by the at least one processor and the at least one memory architecture, wherein the fourth software module is configured to provide a first real-time voice content-to-text content transcription to the first collaboration session participant during the first collaboration session including the first collaboration session participant and the second collaboration session participant, the first real-time voice content-to-text content transcription corresponding to first voice content of the second collaboration session participant in the first collaboration session, wherein the first collaboration session participant only receives the one or more real-time voice content-to-text content transcriptions for each participant of the plurality of participants that the first collaboration session participant selected via the graphical user interface; and a fifth software module executable by the at least one processor and the at least one memory architecture, wherein the fifth software module is configured to indicate to the second collaboration session participant in the first collaboration session via a pop up interface appearing on the original graphical user interface that the first collaboration session participant in the first collaboration session has requested transcription of the first voice content of the second collaboration session participant.

16. The computing system of claim 15, further comprising:
a sixth software module executable by the at least one processor and the at least one memory architecture, wherein the fifth software module is configured to store the preference for the first collaboration session participant to receive the one or more real-time voice content-to-text content transcriptions corresponding to the voice content of the second collaboration session participant in the one or more collaboration sessions including the first collaboration session participant and the second collaboration session participant.

17. The computing system of claim 16, further comprising:
a seventh software module executable by the at least one processor and the at least one memory architecture, wherein the sixth software module is configured to provide a second real-time voice content-to-text content transcription to the first collaboration session participant during a second collaboration session including the first collaboration session participant and the second collaboration session participant, the second real-time voice content-to-text content transcription corresponding to second voice content of the second collaboration session participant in the second collaboration session.

18. The computing system of claim 15, further comprising:
an eighth software module executable by the at least one processor and the at least one memory architecture, wherein the seventh software module is configured to generate the first real-time voice content-to-text content transcription corresponding to the first voice content of the second collaboration session participant in the first collaboration session including the first collaboration session participant and the second collaboration session participant.

* * * * *